United States Patent
Ohtake et al.

[11] Patent Number: 5,552,236
[45] Date of Patent: Sep. 3, 1996

[54] ORGANIC MAGNETIC FILM AND METHOD OF MANUFACTURING THE SAME

[75] Inventors: Tadashi Ohtake, Neyagawa; Norihisa Mino, Setsu; Kazufumi Ogawa, Hirakata, all of Japan

[73] Assignee: Matsushita Electric Industrial Co., Ltd., Japan

[21] Appl. No.: 25,662

[22] Filed: Mar. 3, 1993

[30] Foreign Application Priority Data

Mar. 16, 1992 [JP] Japan .................................. 4-055944

[51] Int. Cl.$^6$ .................................. G11B 5/66; C09J 5/02; B05D 5/12
[52] U.S. Cl. .............. 428/692; 428/694 T; 428/694 TS; 428/900; 156/326; 156/329; 156/330.9; 427/127; 427/128; 427/129; 427/130
[58] Field of Search .................. 428/694 T, 694 TS, 428/692, 900; 156/326, 329, 330.9; 427/127, 128, 129, 130

[56] References Cited

U.S. PATENT DOCUMENTS 4,539,061  9/1985  Sagiv ........................ 156/278
5,158,833 10/1992  Matsuoka et al. .......... 428/678

FOREIGN PATENT DOCUMENTS 0437278  7/1991  European Pat. Off. .
0484746  5/1992  European Pat. Off. .

OTHER PUBLICATIONS

K. Ogawa, et al "Reactions of Chemically Adsorbed Monolayers Induced by Electron Beam Irradiation in Active Gas Atmosphere and Applications for the Preparation of Multilayers", Langmuir, vol. 6, No. 4, 1990.
K. Ikegami et al. Thin Solid films 160 (1988) 139–143.
Patent Abstracts of Japan, unexamined applications, E field, vol. 15, No. 397, Oct. 8, 1991, The Patent Office Japanese Government, p. 37 E 1120 No. 03–160 708 (Sumitomo).
Patent Abstracts of Japan, unexamined applications, C field, vol. 12, No. 482, Dec. 15, 1988, The Patent Office Japanese Government, p. 109 C 553 No. 63–199 741 (Mitsui).
P. A. Chollet, J. Phys., C: Solid State Phys., 7, 4127 (1974).
K. Ikegami, et al., Thin Solid Films, 179, 139 (1989).
I. Hamachi, et al., J. Am. Chem. Soc., 112, 6744 (1990).
S. Kuroda, et al., Thin Solid Films, 159, 285 (1988).

*Primary Examiner*—Leszek Kiliman
*Attorney, Agent, or Firm*—Fish & Richardson, P.C.

[57] ABSTRACT

According to the invention, the surface of a substrate possessing an active hydrogen group is contacted with a chemical adsorbent containing a radical generation precursor group or metal ion capturing group within a molecule—also possessing a reactive functional group such as halosilyl or alkoxy silyl at its end—to form a chemical adsorption film by removing the unreacted chemical adsorbent, radicals are then generated and magnetism is expressed on the chemical adsorption film.

15 Claims, 7 Drawing Sheets

ORGANIC MAGNETIC FILM AND METHOD OF MANUFACTURING THE SAME

FIELD OF THE PRESENT INVENTION

The present invention relates to an organic magnetic film and a method of manufacturing the same. More specifically, the invention concerns organic molecules possessing unpaired electrons attributable to a metal or organic radicals arranged in the chemical adsorption film; since the chemical adsorption film is magnetic, the spin directions are aligned, and a chemically adsorbed organic magnetic film possessing macroscopic magnetism may be realized.

BACKGROUND OF THE INVENTION

In the strictest sense, there is no known example of an organic magnetic monomolecular film or organic magnetic built-up film. Examples of organic magnetic material have been barely realized so far, and nothing is reported about organic magnetic crystals.

Although not yet advanced to the stage of expression as magnetism, studies on Langmuir-Blodgett (LB) film by measurement of electron-spin resonance (ESR) have been attempted. As film components, copper stearate (J. Messier and G. Marc, J. Phys., Paris, 32, 799, 1971), and copper dithiocarbamate with a fatty acid of 18 carbon atoms (P. A. Chollot, J. Phys., C: Solid State Phys., 7, 4127, 1974) are used. In the category of thin films, as disclosed in Japanese Laid-open Patent Hei. 3-160708, an example is known of an organic magnetic thin film formed by plasma polymerization.

In attempting to endow a high molecular weight compound with magnetic properties, a method is known whereby the spin direction is aligned by attaching a functional group having radicals to the pendant portion extending from the main chain.

To obtain organic magnetic materials, therefore, it is believed necessary to satisfy the following two conditions:

First, heightening the spin density by placing multiple unpaired electrons stably in an organic material, and second, increasing the spin rate of parallel arrangement.

However, in the known organic magnetic materials in which the properties of the organic molecule itself are reflected, both spin density and rate of magnetization are still low. This is probably because improvement of spin density and control of spin arrangement are not sufficient. In this circumstance, at present, materials possessing practically sufficient magnetism have not yet been reported.

Strictly speaking, organic molecules having unpaired electrons possess magnetism individually. In most cases, however, when the molecules are gathered and crystallized, they cancel each other, and magnetism is largely lost throughout the crystal. Therefore, in order that the crystals or molecule sets may possess magnetism on the whole—that is, expressing magnetism macroscopically—the molecules must be arranged solidly in order to align their spin direction. Hitherto, in most cases of organic magnetic materials, in the method of aligning spin direction, it has been attempted to capture into the forming matrix other stable substances similar to inert gases or magnetic molecules in a solid structure. The magnetism is then confirmed by measurement.

SUMMARY OF THE INVENTION

A primary object of the invention is thus to present an organic monomolecular film and organic monomolecular built-up film having aligned spin directions and possessing macroscopic magnetism by arranging molecules possessing unpaired electrons in a film state.

More specifically, an object of the invention is to provide an organic film possessing magnetism, which is a chemical adsorption film in which the molecules composing the film are fixed directly or indirectly to a substrate by covalent bonding through at least one atom selected from the group consisting of Si, Ge, Sn, Ti, Zr, S and C, wherein unpaired electrons derived from a metal or radical are provided in the chemical adsorption film.

It is preferable in this invention that the chemical adsorption film is a monomolecular film.

It is preferable in this invention that the component molecules of the chemical adsorption film form a built-up film fixed to the chemical adsorption inner layer by covalent bonding through at least one atom selected from the group consisting of Si, Ge, Sn, Ti, Zr, S and C.

It is preferable in this invention that the magnetism is ferromagnetism, ferrimagnetism, paramagnetism or antiferromagnetism.

It is preferable in this invention that the metal contains an organic metal or an organometallic complex.

It is preferable in this invention that the organic metal is comprised of a typical metal of at least one atom selected from the group consisting of Si, Ge, Sn, Zn and As.

It is preferable in this invention that the organometallic complex is comprised of a transition metal of at least one atom selected from the group consisting of Cr, Mn, Fe, Co, Ni, Zn, Y, Cd, Ru, Rh, Sc, Ti, V, Pd, Pt, Nb, Mo, Tc, Hf, Ta, W, Re, Os and Ir.

It is preferable in this invention that the radical is at least one selected from the group consisting of carbene and functional groups expressed in Formulas (1), (2), (3), (4) and (5) below:

Formula (1)

Formula (2)

Formula (3)

Formula (4)

Formula (5)

Furthermore, an object of the invention is to provide a method of manufacturing an organic magnetic film by contacting and reacting chemical adsorption molecules possessing a radical generation precursor group or metal ion capturing group in a molecule and possessing at least one functional group selected from the group consisting of Formulas (6) and (7), halogenated sulfonyl groups expressed in (8), a halogenated sulfinyl group expressed in Formula (9), Formula (10), and a cyano group with a substrate possessing an active hydrogen and/or alkaline metal, thereby forming a chemical adsorption film, and generating radicals in the film or capturing metal ions:

Formula (6)

(where A represents Si, Ge. Sn. Ti or Zr, X represents a halogen, and n represents 1, 2, 3 or 4)

Formula (7)

(where A' represents Si, Ge, Sn, Ti or Zr, R represents an alkyl group, and n represents 1, 2, 3 or 4)

Formula (8)

(where X represents a halogen)

Formula (9)

(where X represents a halogen)

Formula (10)

(where A" represents O or N).

Furthermore, an object of the invention is to provide a method of manufacturing an organic magnetic film by reacting and contacting chemical adsorption molecules possessing a functional group having a radical or metal in a molecule and possessing at least one functional group selected from the group consisting of Formulas (6') and (7'), halogenated sulfonyl groups expressed in (8'), a halogenated sulfinyl group expressed in Formula (9'), Formula (10'), and a cyano group with a substrate possessing active hydrogen and/or an alkaline metal, thereby forming a chemical adsorption film:

Formula (6')

(where A represents Si, Ge, Sn, Ti or Zr, X represents a halogen, and n represents 1, 2, 3 or 4)

Formula (7')

(where A' represents Si, Ge, Sn, Ti or Zr, R represents an alkyl group, and n represents 1, 2, 3 or 4)

Formula (8')

(where X represents a halogen)

Formula (9')

(where X represents a halogen)

Formula (10')

(where A" represents 0 or N).

It is preferable in this invention that the chemical adsorption molecules are first contacted with the substrate, and then cleaned in a non-aqueous solvent to form a chemical adsorption monomolecular film.

It is preferable in this invention that the chemical adsorption molecules are again contacted with the formed chemical adsorption monomolecular film in a further contacting step to form a built-up film.

It is preferable in this invention that the metal contains an organic metal or an organometallic complex.

It is preferable in this invention that the organic metal is comprised of a typical metal of at least one atom selected from the group consisting of Si, Ge, Sn, Zn and As.

It is preferable in this invention that the organometallic complex is comprised of a transition metal of at least one atom selected from the group consisting of Cr, Mn, Fe, Co, Ni, Zn, Y, Hg, Cd, Ru, Rh, Sc, Ti, V, Pd, Pt, Nb, Mo, Tc, Hf, Ta, W, Re, Os and Ir.

According to the invention, organic molecules possessing unpaired electrons attributable to a metal or organic radicals are arranged in a chemical adsorption film, with their spin direction aligned since the chemical adsorption film is magnetic, so that a chemically adsorbed organic magnetic film possessing macroscopic magnetism is obtained.

In a preferred embodiment of the invention whereby the chemical adsorption film is a monomolecular film, the molecular orientation is superior, and film formation and film thickness control at the angstrom or nanometer level are possible, so that a rigid magnetic ultrathin film of a thinness previously unknown may be realized.

In another preferred embodiment of the invention in which the molecules composing the chemical adsorption film are covalently bonded either directly or indirectly with the chemical adsorption inner layer film (through at least one atom selected from the group consisting of Si, Ge, Sn, Ti, Zr, S, and C, thereby forming a built-film), the density of the film component molecules may be enhanced.

In another preferred embodiment of the invention in which the magnetism is ferromagnetism, ferrimagnetism, paramagnetism or antiferromagnetism, an excellent magnetic property may be expressed.

In a further preferred embodiment of the invention in which the metal is organic or typical in an organometallic complex or transition metal, an excellent magnetic property may be expressed.

In another preferred embodiment of the invention in which the organic radical is a functional group expressed in Formulas (1), (2), (3), (4), (5), and carbene, an excellent magnetic property may be expressed.

According to the manufacturing method of the invention, moreover, this organic magnetic film may be manufactured efficiently and without complication.

DETAILED DESCRIPTION OF THE INVENTION

The organic magnetic film of the invention is firmly fixed to a substrate or an inner layer film directly or indirectly through covalent bonding, and in principle, film formation and film thickness control at the angstrom or nanometer level are possible. In this way a rigid magnetic ultrathin film of a thinness previously unknown can be realized.

By the method of aligning the spin of unpaired electrons, the previously mentioned problems are solved by making use of topological symmetry. That is, by employing the chemical adsorption film, which is said to be very well oriented, with the film component molecules distributed almost uniformly on the substrate, an organic magnetic film was formed by providing the film component molecules with magnetism and thus aligning their spin direction.

More specifically, film component molecules may be used possessing a radical generation precursor, metal ion capturing agent or radicals, and a molecule possessing metals. In film composed of the first-mentioned molecules, unpaired electrons are formed, for example, by irradiation with ultraviolet rays; in film composed of the second type of molecules, for example, by immersion or other treatments in a metal ion dissolved solution. But when unpaired electrons are formed, since the molecules are already fixed to the substrate, and re-arrangement by the magnetic interaction between molecules is not effected, the spin of the prepared unpaired electrons is preserved. In this way, high spin density and high spin arrangement control are enabled, and macroscopic magnetism can be expressed.

The magnetism discussed herein refers to the characteristic expressed by unpaired electrons in metals and/or radicals.

To obtain a controllable film thickness at the angstrom or nanometer level, there exists no other method than the forming of monomolecular film at the present technological level. The monomolecular film-forming methods presently known include the Langmuir-Blodgett method and chemical adsorption method; the latter is superior with respect to durability in processing after film formation.

The organic magnetic film of the invention is characterized by the orientation of organic molecules possessing unpaired electrons attributable to metals or organic radicals, and by the expression of magnetism.

The chemical adsorbent is a compound selected from the group consisting of radical generation precursors, a metal ion capturing agent—the compound transformed to the same after a reaction process—and a compound possessing a radical and metal from the beginning, i.e. a molecule possessing a functional group that can be fixed on a substrate or chemical adsorption film (inner layer). Functional groups that can be fixed on the substrate or inner layer include, among others, the groups expressed in Formulas (6) and (7), a halogenated sulfonyl group expressed in Formula (8), and a halogenated sulfinyl group expressed in Formulas (9) and (10), and an cyano group, but these are not limitative of the invention. Herein, examples of halogens include Cl, Br and I,—Cl is particularly preferred for its reactivity—but even with Br and I, a similar chemical adsorption monomolecular film and chemical adsorption built-up film can be obtained.

Examples of radical generation precursors include molecules possessing a diazo group, azo group, nitro group, peroxide group, and azide group, but these are not limitative. Within the chemical adsorption film, one of them alone may be present or a mixture thereof may coexist.

Examples of metal ion capturing agents include pyridine, piperidine, phenanthroline, ethylene diamine, triethylene diamine, Schiff's salt and others which may become chelate-forming molecules, or host compounds including polyether, polythioether, trialkyl phosphine, triphenyl phosphine, phthalocyanines, chlorophylis, and porphyrin, but these are not limitative.

The metal to be captured varies with the metal ion capturing agent, but a metal is preferred possessing an odd number of electrons on the s, p, d and/or f tracks after forming a complex. The metal to be captured may be either a single metal or a mixture of a plurality of metals.

The formed radical generation precursor or transition metal capturing agent on the substrate possessing a chemical adsorption film—a film component molecule—is irradiated with ultraviolet rays, or is treated by immersion in a metal ion dissolved solution, thereby generating unpaired electrons. The moment the unpaired electrons are generated, the molecules are already fixed to the substrate by covalent bonding, and therefore re-arrangement by the magnetic interaction between molecules is not effected, and the spin of the generated unpaired electrons is preserved. As a result, a macroscopic magnetism can be expressed.

When employing an organic radical molecule as the chemical adsorbent, it is preferable to use at least one selected from the group consisting of a functional group expressed in Formulas (1), (2), (3), (4) and (5). More specifically, molecules possessing functional groups as shown in FIG. 1(a) to (g) are usable, but these are not limitative. One of these alone or a mixture of a plurality of functional groups may be used.

One method for obtaining stronger magnetism involves incorporating unpaired electrons into the conjugate system to contribute to conjugate stabilization. In this case, a substance possessing the conjugate system from the stage of chemical adsorbent may be used, but another method involves first forming a chemical adsorption film, then polymerizing the film to create the conjugate system. In the latter method, for example, a chemical adsorption film is formed first by using an acetylene derivative or diacetylene derivative as a chemical adsorbent; the conjugate system is then created by polymerization, using electron beams or a catalyst, but these methods are not limitative.

Incidentally, the magnetism of the organic magnetic monomolecular film and organic magnetic built-up film can be confirmed as follows:

In a simple procedure, a fine powder of magnetized iron is placed under a sheet of paper, and a substrate possessing the organic magnetic monomolecular film or organic magnetic built-up film is placed thereon, and is lifted in the air together with the thin paper. The degree of attraction of magnetized iron particles to the paper is observed. By removing the substrate from the paper, the dropping off of the fine powder attracted to the paper is observed, and the presence or absence of magnetism is known. In another method, the magnetic property can be measured by using magnetic characteristic measuring apparatus for ESR (electron spin resonance) or the like.

The organic magnetic monomolecular film and organic magnetic built-up film of the invention are described in detail below, together with their method of manufacture. It must be noted, however, that the invention is not limited to the following practical embodiments.

EXAMPLE 1

An adsorption solution A was prepared.

In a mixed solvent containing hexadecane, carbon tetrachloride and chloroform at a weight ratio of 80:12:8, 8-octyl trichlorosilane and 14-(3,5-dicyanophenyl)tetradecyl trichlorosilane, which are chemical adsorbents, were each dissolved at a concentration of 0.5% by weight, and adsorption solution A was thus obtained.

Figure 1A:
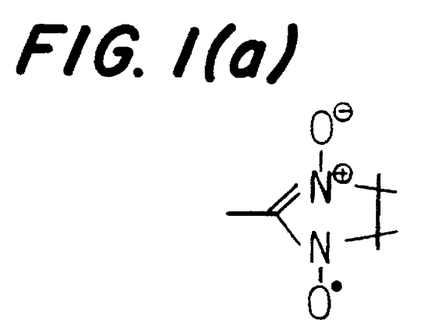
FIG. 1(a) to (g) shows practical examples of radical molecules that can be used in the invention.
Figure 1B:
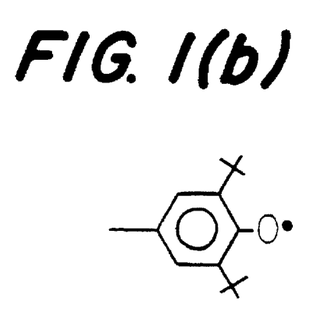
Figure 1C:
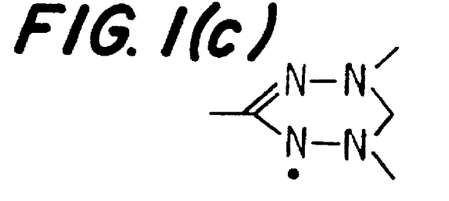
Figure 1D:
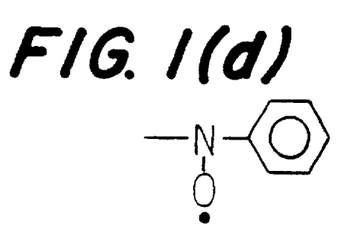
Figure 1E:
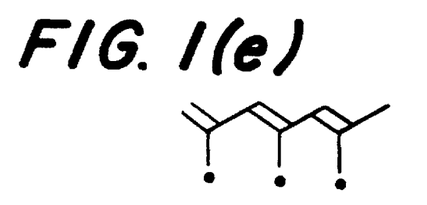
Figure 1F:
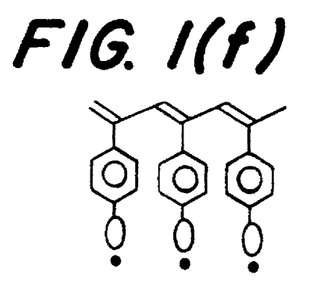
Figure 1G:
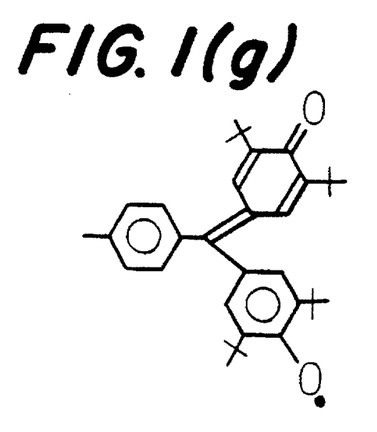
Figure 2:
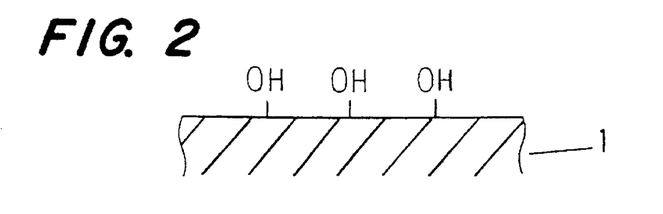
FIG. 2 is a view of essential parts of a substrate in example 1 of the invention magnified to the molecular level.

As shown in FIG. 2, a glass substrate 1 was used as a hydrophilic substrate. This glass substrate 1 was cleaned in an organic solvent, and immersed in adsorption solution A for one hour. By this treatment, a dehydro-chlorination reaction (hydrogen chloride elimination reaction) first was induced by 8-octyl trichlorosilane, the Si—Cl of 14-(3,5-dicyanophenyl)tetradecyl trichlorosilane, and the OH of glass substrate 1, and the bonds expressed in Formulas (11) and (12) were created almost uniformly, with a chemical adsorption film being formed on glass substrate 1.

Figure 3:
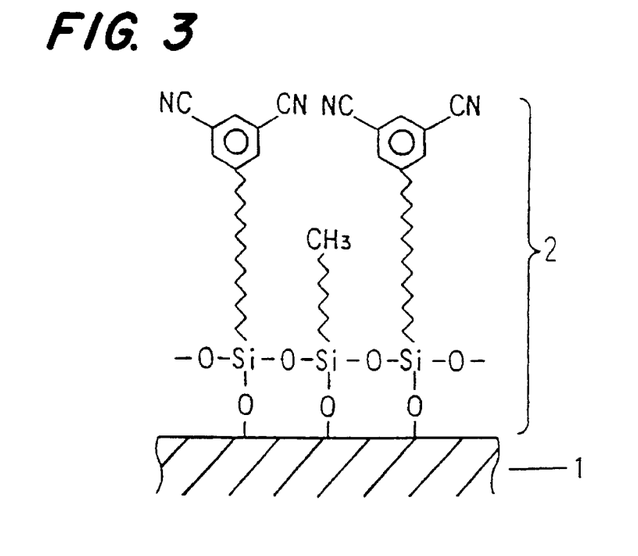
FIG. 3 is a view of essential parts of a chemical adsorption monomolecular film in example 1 of the invention magnified to the molecular level.

The substrate was then washed in chloroform for 15 minutes, and then in water for another 15 minutes, so Formulas (11) and (12) over the entire substrate surface were transformed into Formula (13), and a chemical adsorption monomolecular film 2 was formed as shown in FIG. 3. Incidentally, since the ratio of the chemical adsorbents in adsorption solution A was 1:1. Formulas (11) and (12) were considered to be alternately adsorbed almost uniformly, and hence the substrate was most likely coated with the repetitive unit expressed in Formula (13). This monomolecular film was fixed firmly to the substrate, and possessed an extremely high water-repelling property.

Fourier transform infrared spectrum (FTIR) measurement of the created chemical adsorption film obtained characteristic signals for this structure at 2925 to 2840 $cm^{-1}$ (attributable to —$CH_2$—), 2240 (attributable to C≡N ), 1620, 1500, 1450 (attributable to a benzene skeleton), 1470 (attributable to —$CH_2$—), and 1080 $cm^{-1}$ (attributable to SiO), and hence formation of a film was confirmed.

Figure 4:
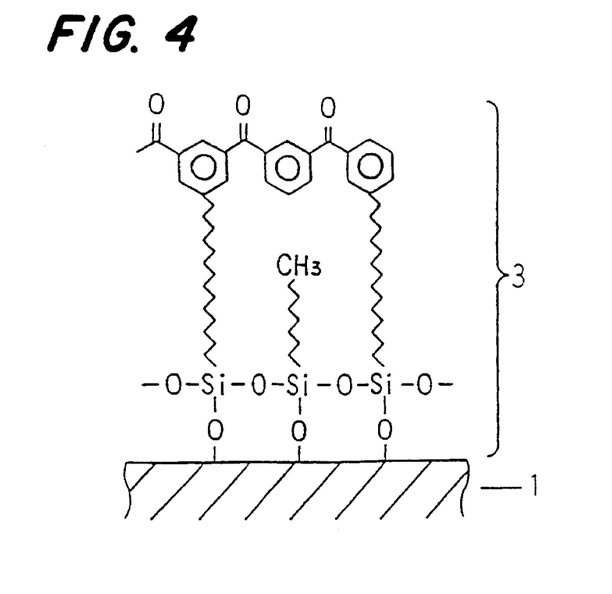
FIG. 4 is a view of essential parts of a chemical adsorption monomolecular film in example 1 of the invention magnified to the molecular level.

Next. Grignard's reagent prepared from m-dibromobenzene in dry tetrahydrofuran was poured into a vessel containing the substrate 1 possessing chemical adsorption monomolecular film 2, and was allowed to react for 30 minutes. After cleaning in ether for five minutes and washing in water for five minutes, a chemical adsorption monomolecular film 2 as shown in FIG. 4 was formed over the entire surface of the substrate. This monomolecular film was firmly fixed to the substrate, and possessed an extremely high water-repelling property.

FTIR measurement of the obtained chemical adsorption film showed that the previous signal at 2240 $cm^{-1}$ was eliminated, and a signal nearly appeared at 1700 $cm^{-1}$ (attributable to C=O), while the signal intensity was approximately doubled at 1620, 1500 and 1450 $cm^{-1}$. Hence, the formation of a film was recognized.

Figure 5:
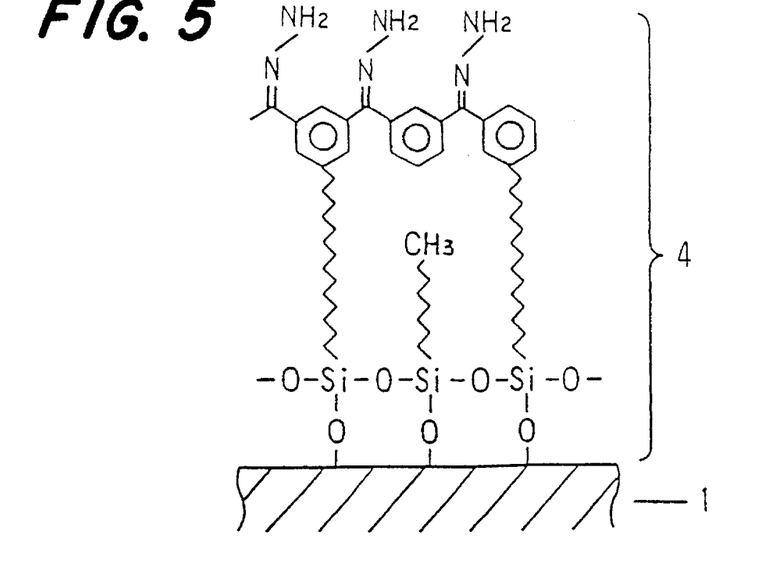
FIG. 5 is a view of essential parts of a chemical adsorption monomolecular film in example 1 of the invention magnified to the molecular level.

Hydrazine monohydrate was then mixed in n-propanol, and substrate 1 possessing the chemical adsorption monomolecular film 3 was immersed therein, and reacted for 30 minutes in reflux by heating. Next, by cleaning in ether for five minutes and then washing in water for five minutes, a chemical absorption monomolecular film 4 as shown in FIG. 5 was formed on the substrate surface. This monomolecular film was firmly fixed to the substrate, and was superior in water-repellency.

FTIR measurement of the obtained chemical adsorption film showed that the previous signal at 1700 $cm^{-1}$ was eliminated, and new signals appeared at 3500 (attributable to $NH_2$) and 1650 $cm^{-1}$ (attributable to C=N), and thus formation of the film was confirmed.

Figure 6:
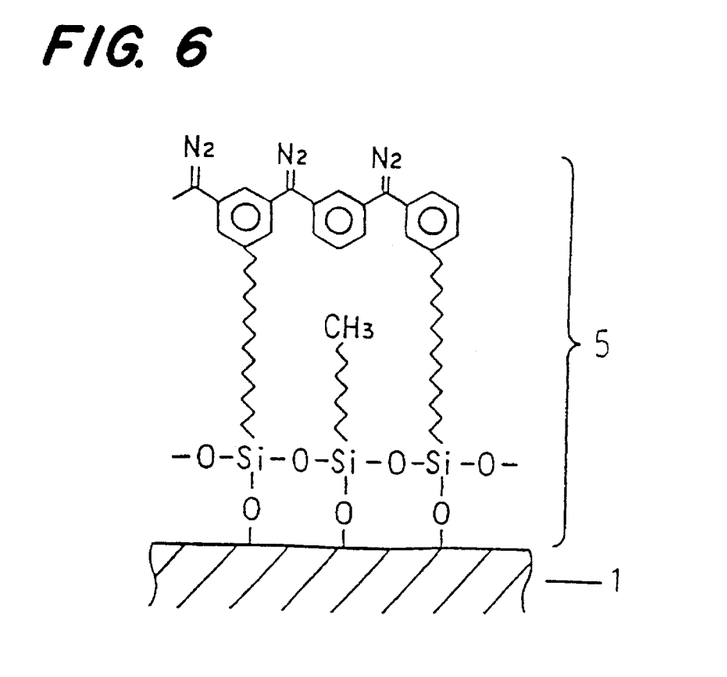
FIG. 6 is a view of essential parts of a chemical adsorption monomolecular film in example 1 of the invention magnified to the molecular level.

Active manganese dioxide was suspended in dry ether, and substrate 1 possessing the chemical adsorption monomolecular film 4 was then immersed therein. Afterwards, by cleaning in ether for five minutes and washing in water for five minutes, a chemical adsorption monomolecular film 5 as shown in FIG. 6 was formed over the entire substrate surface. This monomolecular film was firmly fixed to the substrate, and was superior in water-repellency.

FTIR measurement of the obtained chemical adsorption film showed that the previous signal at 1650 $cm^{-1}$ was eliminated, and new signals appeared at 2140 and 2120 $cm^{-1}$ (attributable to C=$N_2$), and thus formation of the film was confirmed.

The obtained chemical adsorption monomolecular film 5 is a radical generation precursor. Radicals were then generated on the chemical adsorption film, and their magnetization was confirmed.

While irradiating the substrate 1 possessing chemical adsorption monomolecular film 5 with ultraviolet rays at 1.9K, magnetization was measured using the Faraday method. The diazo group in FIG. 6 released $N_2$ by ultraviolet irradiation, and changed to a corresponding carbene, forming a chemical adsorption monomolecular film 6 as shown in FIG. 7.

As a result, the magnetization presented a hysteresis loop symmetrical about the origin along with the subsequent increase or decrease of the magnetic field, according to the S-shaped initial magnetization curve. Residual magnetization was also shown. Hence, the chemical adsorption monomolecular film 6 was found to behave as a ferromagnetic material. The same held true when the temperature was further increased. Furthermore, when substrate 1 possessing chemical adsorption monomolecular film 6 was placed in a magnetic field of 100 G, a magnetization of 0.50 emuG was obtained.

Figure 7:
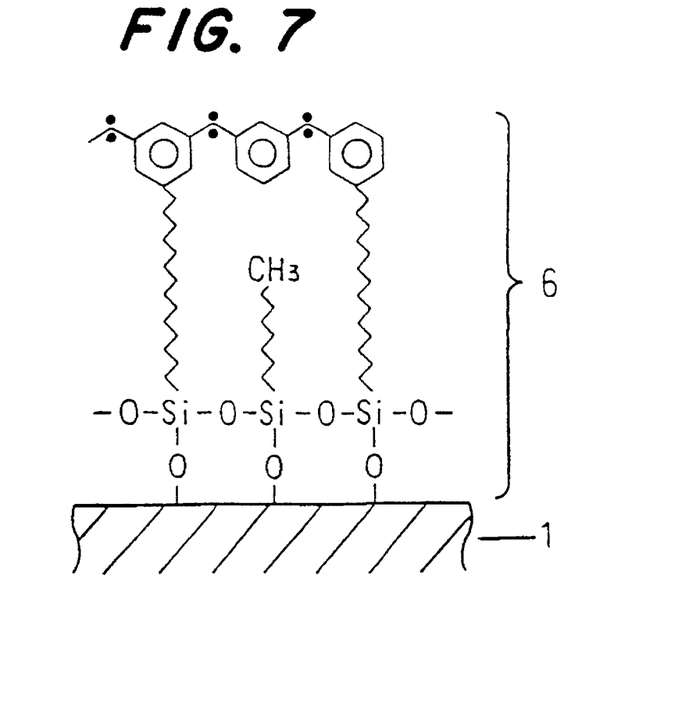
FIG. 7 shows a chemical adsorption magnetic film obtained in example 1 of the invention magnified to the molecular level.

Concerning the bond in FIG. 7, there was some doubt as to whether it was completely polymerized over the entire substrate surface, and it seems more realistic to propose a model of a set of molecules having a certain degree of polymerization. In any case, such strong ferromagnetism is estimated to be a result of topological symmetry by making use of the chemical adsorption film.

EXAMPLE 2

An adsorption solution B was prepared.

In a mixed solvent of hexadecane, carbon tetrachloride and chloroform blended at a weight ratio of 80:12:8, 10-((4-chloromethyl)phenyl)decyl trichlorosilane—which is a chemical adsorbent—was dissolved at a concentration of about 1% by weight, and adsorption solution B was thus prepared.

As a hydrophilic substrate, a glass substrate 1 as in Example 1 was used, and was washed in an organic solvent and immersed in adsorption solution B for one hour. By this treatment, a dehydro-chlorination reaction was first induced by the Si—Cl of 10 -((4-chloromethyl)phenyl)decyl trichlorosilane and the OH of the glass substrate 1, and the bond in Formula (14) was achieved nearly uniformly, with a chemical adsorption film beeing formed on glass substrate 1.

Formula (14)

Figure 8:
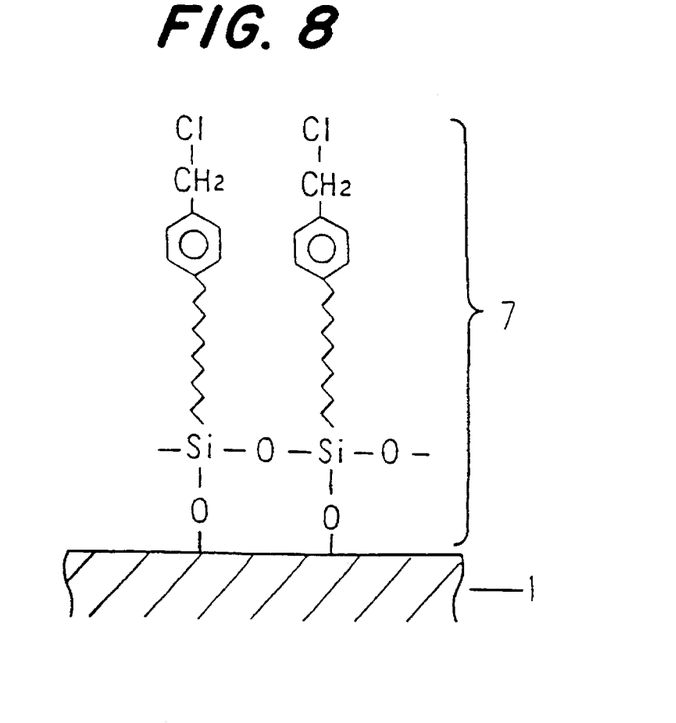
FIG. 8 is a view of essential parts of a chemical adsorption monomolecular film in example 2 of the invention magnified to the molecular level.

The substrate was then washed in chloroform for 15 minutes, and then in water for another 15 minutes, and Formula (14) over the entire surface of the substrate was transformed into Formula (15), with the result that a chemical adsorption monomolecular film 2 was formed as shown in FIG. 8. This monomolecular film was fixed firmly to the substrate, and was superior in water-repellency.

Formula (15)

From FTIR measurement, characteristic signals for this structure were obtained at 3060 $cm^{-1}$ (attributable to benzene C—H), 2920 to 2840 $cm^{-1}$ (attributable to —$CH_2$—), 1890, 1610, 1500, 1450 $cm^{-1}$ (attributable to a benzene skeleton), 1470 $cm^{-1}$ (attributable to —$CH_2$—), 1080 $cm^{-1}$ (attributable to Si—O), and 850 $cm^{-1}$ (attributable to benzene C—H), and thus formation of a film was confirmed.

A new chemical adsorbent C was then synthesized; for C, Schiff's base was selected.

At room temperature, diethylene triamine and benzaldehyde were allowed to react for 1.5 hours, and chemical adsorbent C shown in Formula (16) was synthesized.

Formula (16)

Figure 9:
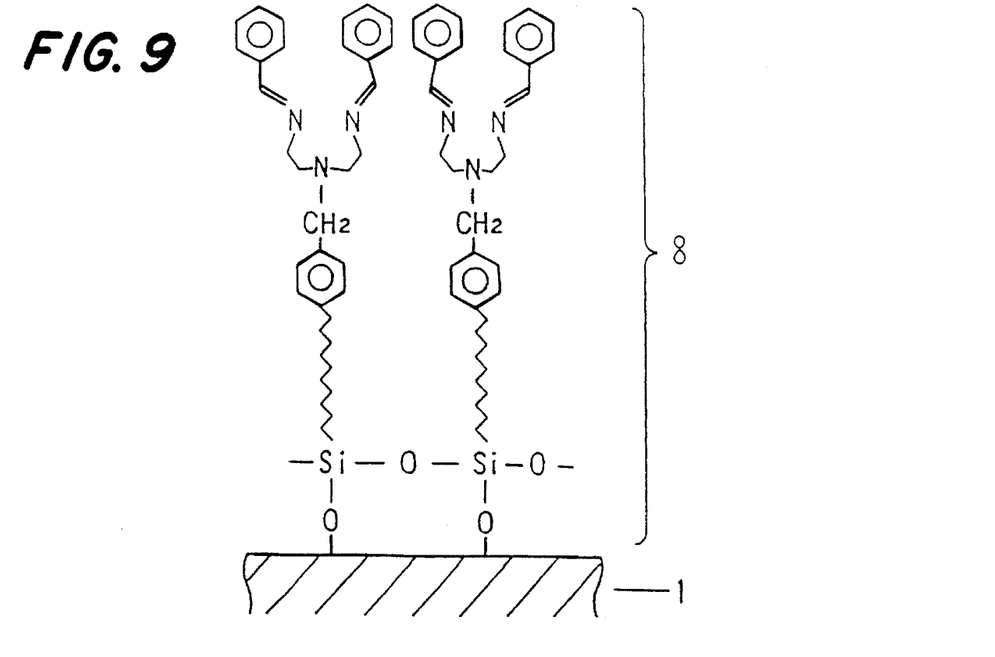
FIG. 9 is a view of essential parts of a chemical adsorption monomolecular film in example 2 of the invention magnified to the molecular level.

Next, the substrate 1 possessing chemical adsorption monomolecular film 7 was immersed in 1,4-dioxane, and a solution of chemical adsorbent C in 1,4-dioxane was poured therein. After allowing to react for 30 minutes, followed by cleaning in chloroform for five minutes and washing in water for five minutes, a chemical adsorption monomolecular built-up film 8 as shown in FIG. 9 was formed. This film was extremely superior in water-repellency.

From FTIR measurement, a characteristic signal for this structure was newly obtained at 1650 $cm^{-1}$ (attributable to C=N), and the signals at 1890, 1610, 1450 $cm^{-1}$ (attributable to a benzene skeleton) were about tripled. Hence the formation of a film was confirmed.

Figure 10:
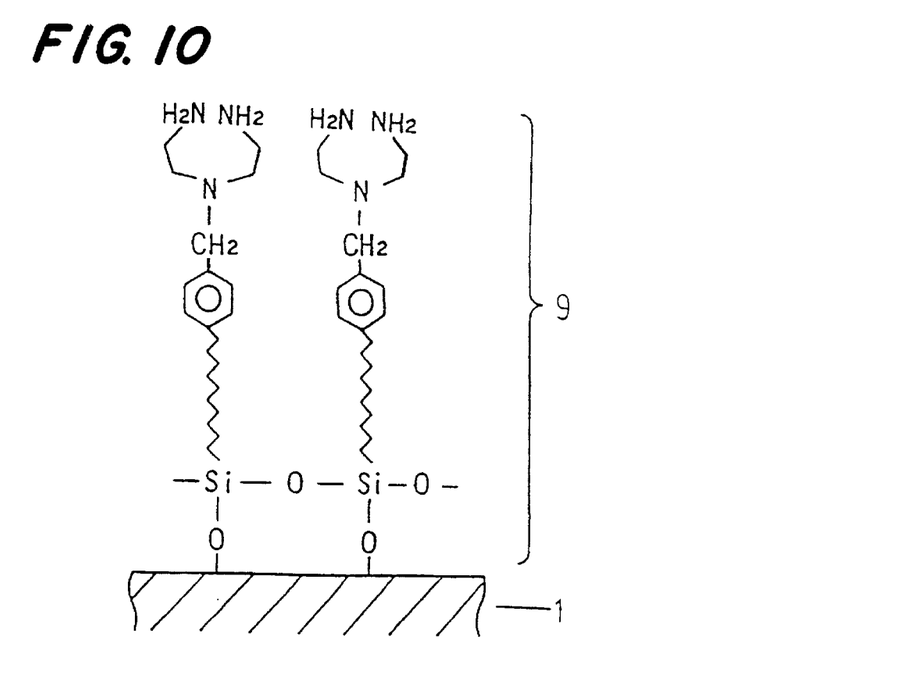
FIG. 10 shows a chemical adsorption magnetic film obtained in example 2 of the invention magnified to the molecular level.

By washing substrate 1 possessing this chemical adsorption monomolecular built-up film 8 in diluted hydrochloric acid, a chemical adsorption monomolecular built-up film 9 was formed over the entire surface of the substrate as shown in FIG. 10. FTIR measurement showed that the previous signal at 1650 $cm^{-1}$ was eliminated, and the signals at 1890, 1610, 1450 $cm^{-1}$ (attributable to a benzene skeleton) were nearly reduced by two-thirds, and hence a formation of a film was confirmed.

Consequently, in an aqueous solution of $NiCl_2 \cdot 6H_2O$, substrate 1 possessing this chemical adsorption monomolecular built-up film 9 was immersed for one hour, and washed in water for five minutes. Through this treatment, the chemical adsorption monomolecular built-up film 9 could absorb $Ni^{2+}$. The intake of $Ni^{2+}$ was confirmed by obtaining the signal attributable to Ni from measurement of X-ray photon spectroscopy (XPS).

Substrate 1 possessing the $Ni^{2+}$ chemical adsorption monomolecular built-up film 9 was allowed to stand for 10 seconds on a thin sheet of paper placed over fine powder of magnetized iron, and the substrate was lifted together with the paper. As a result, it was confirmed that the iron powder was attracted to the substrate through the paper. When the substrate was separated from the paper, the iron powder dropped off, thus confirming the magnetism of chemical adsorption monomolecular film 9.

EXAMPLE 3

An adsorption solution D was prepared.

In a mixed solvent containing hexadecane, carbon tetrachloride and chloroform at a weight ratio of 80:12:8, 10-decyl trichlorosilyl (1-oxo-2,2,6,6-tetramethyl piperidinyl) ether as a chemical adsorbent was dissolved at a concentration of about 1% by weight, and thus adsorption solution D was prepared.

Figure 11:
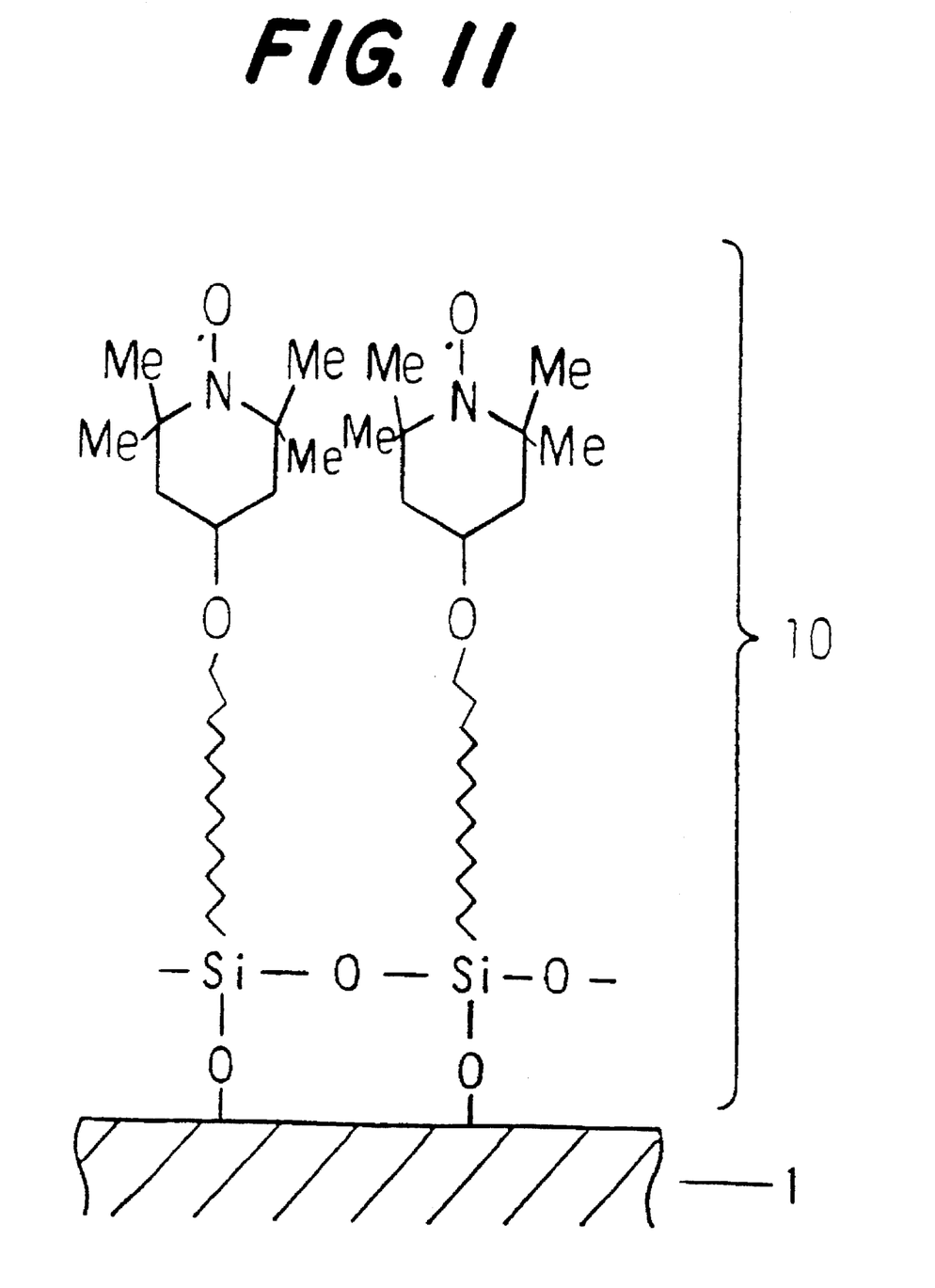
FIG. 11 shows a chemical adsorption magnetic film obtained in example 3 of the invention magnified to the molecular level.

The substrate in this case, quartz, was cleaned in an organic solvent, and immersed in adsorption solution D for one hour. Afterwards, by cleaning in chloroform for 15 minutes, a chemical adsorption monomolecular film 10 was formed over the entire substrate surface as shown in FIG. 11. This monomolecular film was firmly fixed to the substrate.

From FTIR measurement, characteristic signals for this structure were observed at 2020 $cm^{-1}$, 2840 $cm^{-1}$ (attributable to —$CH_2$—), 1080 $cm^{-1}$ (attributable to Si—O), and 950 $cm^{-1}$ (attributable to N—O), and hence formation of a film was confirmed.

Next, the ESR spectrum was measured. At 77K in the measuring conditions of microwave output 0.3 mW, modulation width 0.1 G, response time 0.1 sec, and magnetic field 3300±1000 G, three singlet signals of g value 2.0064 were obtained. These signals broadened as the temperature was gradually increased, and disappeared at 313K.

Furthermore, it was determined by ESCA (electron spectroscopy for chemical analysis) that the level of magnetic impurities was less than 0.02% by weight, a negligible level. This result showed that the ferromagnetism at room temperature was due to chemical adsorption monomolecular film 10.

EXAMPLE 4

An adsorption solution E was prepared.

In a mixed solvent of hexadecane, carbon tetrachloride and chloroform at a weight ratio of 80:12:8, 1,8-bistochlorosilyl octane (as a chemical adsorbent) was dissolved at a concentration of about 1% by weight, and adsorption solution E was thus prepared.

A glass substrate 1 as used in Example 1 was employed and cleaned in an organic solvent, and then immersed in adsorption solution E for one hour. By washing in chloroform for 10 minutes, a chemical adsorption monomolecular film 11 as shown in Formula (17) was formed over the entire surface of the substrate.

$$Cl_3Si(CH_2)_8-\underset{\underset{O-}{|}}{\overset{|}{Si}}-O-$$ Formula (17)

Figure 12:
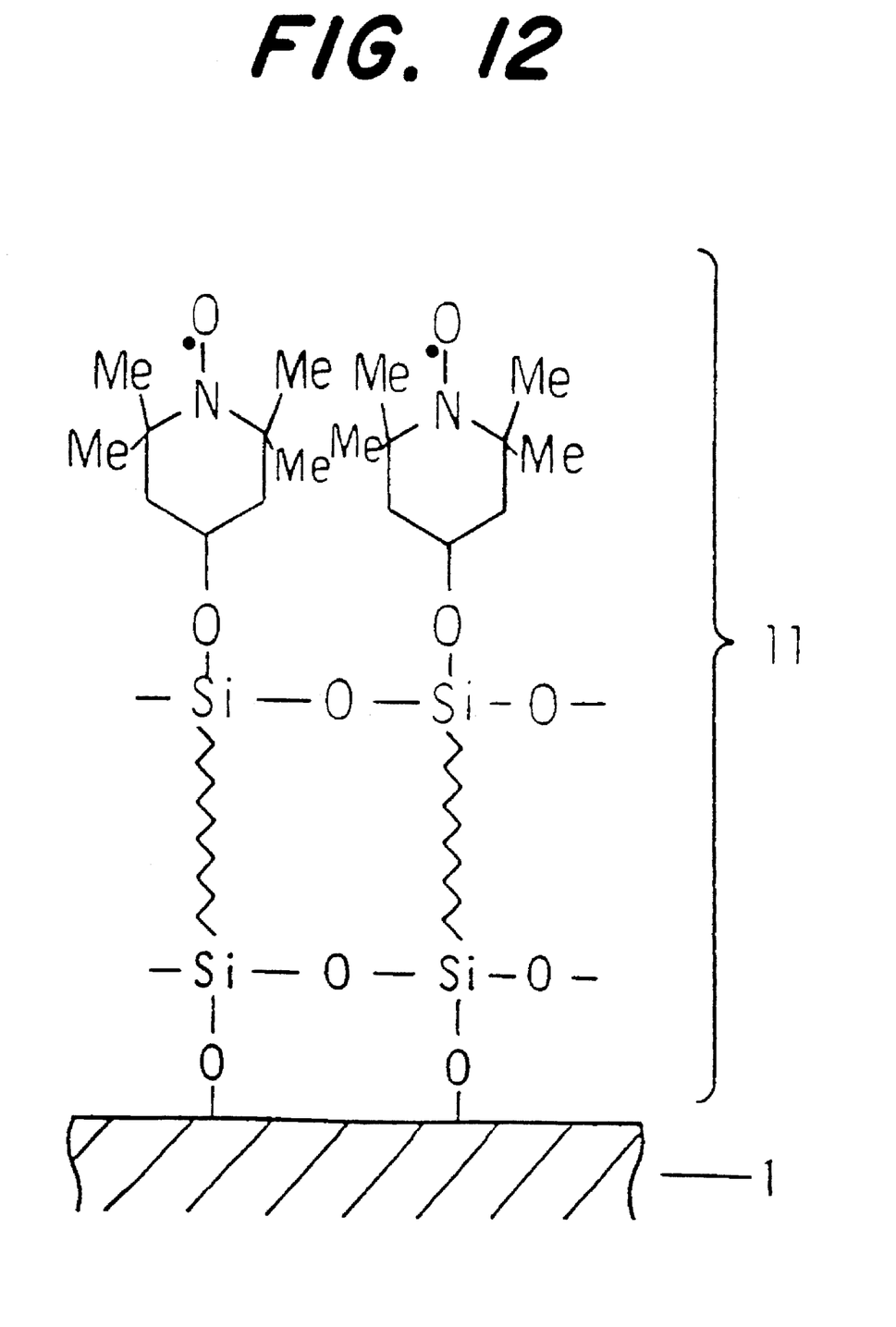
FIG. 12 shows a chemical adsorption magnetic film obtained in example 4 of the invention magnified to the molecular level.

Next, the glass substrate possessing monomolecular film 11 was immersed for 1.5 hours in a solution of 4-hydroxy-2,2,6,6-tetramethyl piperidino-1-oxo/chloroform, and washed in chloroform for 15 minutes. Through this treatment, a chemical adsorption monomolecular film 11 as shown in FIG. 12 was formed.

From FTIR measurement, characteristic signals for this structure were observed at 2920 $cm^{-1}$, 2840 $cm^{-1}$ (attributable to $-CH_2-$), 1080 $cm^{-1}$ (attributable to Si—O), and 960 $cm^{-1}$ (attributable to N—O), and hence the formation of the film was confirmed.

Next, the ESR spectrum was measured. At 77K in the measuring conditions of microwave output 0.3 mW, modulation width 0.1 G, response time 0.1 sec, and magnetic field 3300±1000 G, three singlet signals of g value 2.0070 were obtained. These signals broadened as the temperature was gradually increased, and disappeared at 303K. As the reference for determination of g value, MnO was used.

Furthermore, it was determined by ESCA analysis that the level of magnetic impurities was less than 0.02% by weight, a negligible level. This result showed that the ferromagnetism at room temperature was due to chemical adsorption monomolecular film 11.

As the usual measuring limit of ESR, the number of spins is said to be about $10^{10}$ in the case of paramagnetic material. However, for example, in the chemical adsorption monomolecular film 11 prepared in Example 4, since the spin density is one per 25 square angstroms, the number of spins is about $10^{11}$ on a 1 $mm^2$ specimen; this is merely a theoretical figure and the actual number is evidently much smaller. It is, however, probably not possible to measure this accurately. In any case, the spectrum was so clearly obtained from such a small quantity of spins that this suggests the high signficance of the mutual action exchange within the film.

According to the embodiments described herein, an excellent organic magnetic film can be realized. Such a thin film with a superior orientation performance will likely spur new research in the field of organic magnetic thin films. Considering the practical aspects, applications stemming from the latest technology are more than can be imagined. By replacing existing inorganic magnetic thin film materials, it seems possible to present practical magnetic thin film materials capable of exhibiting excellent characteristics. In addition, when organic molecules possessing unpaired electrons attributable to the metal or organic radicals are arranged in the chemical adsorption film, and because said film is magnetic, the spin directions are aligned, and a chemically adsorbed organic magnetic film possessing a macroscopic magnetism may be realized.

As one application of the invention, an organic magnetic film is far superior in biocompatibility than an inorganic magnet. For example, organic magnetic film as a microwave absorber can be useful for a superheating cancer treatment agent and a magnetic pulse medium, such as an embedding type muscle strength-accumulating element or a blood circulation accelerating element.

Furthermore, although magnets are normally black, an organic magnetic film of the invention is thin enough not to affect a base color. However, the film, if slightly increased in thickness, may affect the base color by changing the functional group.

Moreover, an organic film can be employed as an improved mass-storage magnetic recording and optical magnetic recording medium; therefore, a high-precision magnetic recording head can be manufactured.

In controlling the degree of magnetization, the thickness of an organic magnetic film is decided by controlling the density of molecules as well as the number of layers accumulated.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A chemical adsorption magnetic film, consisting essentially of molecules fixed directly or indirectly to a substrate by covalent bonding through at least one atom selected from the group consisting of Si, Ge, Sn, Ti, Zr, S and C, wherein unpaired electrons on a metal or radical are provided in the film.

2. The magnetic film of claim 1, wherein the film is a monomolecular film.

3. The magnetic film of claim 1, further comprising an inner layer comprising an intermediate film between the substrate and an overlaying film containing the unpaired electrons, wherein the molecules are fixed to the inner layer of the film by covalent bonding through at least one atom selected from the group consisting of Si, Ge, Sn, Ti, Zr, S and C.

4. The magnetic film of claim 1, wherein the metal contains an organic compound comprising a metal atom or an organometallic complex.

5. The magnetic film of claim 1, wherein the radical is at least one member selected from the group consisting of carbene and functional groups expressed in Formulas (A), (B), (C), (D) and (E) below:

Formula (A)

Formula (B)

-continued

Formula (C)

Formula (D)

Formula (E)

6. The magnetic film of claim 5, wherein the metal atom is at least one metal atom selected from the group consisting of Si, Ge, Sn, Zn and As.

7. The magnetic film of claim 5, wherein the organometallic complex is comprised of a transition metal of at least one atom selected from the group consisting of Cr, Mn, Fe, Co, Ni, Zn, Y, Hg, Cd, Ru, Rh, Sc, Ti, V, Pd, Pt, Nb, Mo, Tc, Hf, Ta, W, Re, Os and Ir.

8. The magnetic film of claims 1, 2 or 3, wherein the film is ferromagnetic, ferrimagnetic, paramagnetic, or antiferromagnetic.

9. A method of manufacturing a chemical adsorption magnetic film, said method comprising
(A) contacting and reacting
(i) chemical adsorption molecules possessing a radical generation precursor group or metal ion capturing group in a molecule and possessing at least one functional group selected from the group consisting of Formulas (F) and (G), halogenated sulfonyl groups expressed in Formula (H), halogenated sulfinyl groups expressed in Formula (I), Formula (J), and a cyano group with
(ii) a substrate possessing an active hydrogen and/or alkaline metal, thereby forming a chemical adsorption film, and
(B) generating radicals in the chemical adsorption film or capturing metal ions:

$AX_n$  Formula (F)

where A represents Si, Ge, Sn, Ti or Zr, X represents a halogen, and n represents 1, 2, 3 or 4

$A'(OR)_n$  Formula (G)

where A' represents Si, Ge, Sn, Ti or Zr, R represents an alkyl group, and n represents 1, 2, 3 or 4

Formula (H)

where X represents a halogen

Formula (I)

where X represents a halogen

Formula (J)

where A" represents O or N.

10. A method of manufacturing a chemical adsorption magnetic film, said method comprising contacting and reacting
(i) chemical adsorption molecules possessing a functional group having a radical or metal in a molecule and possessing at least one functional group selected from the group consisting of Formulas (J) and (K), halogenated sulfonyl groups expressed in Formula (L), halogenated sulfinyl groups expressed in Formula (M), Formula (N), and a cyano group with
(ii) a substrate possessing an active hydrogen and/or alkaline metal, thereby forming a chemical adsorption film:

$AX_n$  Formula (J)

where A represent Si, Ge, Sn, Ti or Zr, X represents a halogen, and n represents 1, 2, 3 or 4

$A'(OR)_n$  Formula (K)

where A' represents Si, Ge, Sn, Ti or Zr, R represents an alkyl group, and n represents 1, 2, 3 or 4

Formula (L)

where X represents a halogen

Formula (M)

where X represents a halogen

Formula (N)

where A" represents O or N.

11. The method of manufacturing an magnetic film of claims 9 or 10, wherein the chemical adsorption molecules are first contacted and reacted with the substrate, and then contacted with a non-aqueous solvent to remove unreacted material.

12. The method of manufacturing an magnetic film of claim 11, wherein the chemical adsorption molecules are again contacted with the formed chemical adsorption monomolecular film in a further contacting step to form a built-up film.

13. The method of manufacturing an magnetic film of claims 9 or 10, wherein the metal contains an organic metal or an organometallic complex.

14. The method of manufacturing an magnetic film of claim 13, wherein the organic metal is comprised of at least one atom selected from the group consisting of Si, Ge, Sn, Zn and As.

15. The method of manufacturing an magnetic film of claim 13, wherein the organometallic complex is comprised of a transition metal of at least one atom selected from the group consisting of Cr, Mn, Fe, Co, Ni, Zn, Y, Hg, Cd, Ru, Rh, Sc, Ti, V, Pd, Pt, Nb, Mo, Tc, Hf, Ta, W, Re, Os and Ir.

* * * * *